United States Patent
Leijon (10) Patent No.: US 12,301,428 B2
(45) Date of Patent: May 13, 2025

(54) QUEUE-BASED ORCHESTRATION SIMULATION

(71) Applicant: Cisco Technology, Inc., San Jose, CA (US)

(72) Inventor: Viktor M. E. Leijon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 18/151,999

(22) Filed: Jan. 9, 2023

(65) Prior Publication Data

US 2024/0235949 A1    Jul. 11, 2024

(51) Int. Cl.
*H04L 41/14*    (2022.01)
*G06F 9/54*    (2006.01)
*H04L 41/12*    (2022.01)

(52) U.S. Cl.
CPC ............ *H04L 41/145* (2013.01); *G06F 9/546* (2013.01); *H04L 41/12* (2013.01)

(58) Field of Classification Search
CPC ..... H04L 41/145; H04L 41/12; H04L 41/122; H04L 41/14; G06F 9/546; G06F 9/54
See application file for complete search history.

(56) References Cited

U.S. PATENT DOCUMENTS

| 11,010,205 B2 | 5/2021 | Sharma et al. | |
| 2010/0220622 A1 | 9/2010 | Wei | |
| 2016/0080221 A1* | 3/2016 | Ramachandran | ... H04L 43/0876 709/224 |
| 2016/0142271 A1 | 5/2016 | Dunne et al. | |
| 2019/0182128 A1 | 6/2019 | Shimamura et al. | |
| 2019/0280918 A1* | 9/2019 | Hermoni | ............... H04L 41/069 |
| 2021/0105185 A1* | 4/2021 | Parekh | .................... H04L 41/40 |
| 2021/0144517 A1 | 5/2021 | Guim Bernat et al. | |
| 2022/0078093 A1 | 3/2022 | Bruun, III et al. | |
| 2022/0116304 A1* | 4/2022 | Sommers | .............. H04L 43/062 |
| 2022/0224605 A1* | 7/2022 | Jain | ...................... G06F 9/30189 |
| 2022/0224762 A1* | 7/2022 | Feng | ................... H04L 67/1008 |

OTHER PUBLICATIONS

Ibrahim Afolabi et al., "Dynamic Resource Provisioning of a Scalable E2E Network Slicing Orchestration System," ResearchGate, Dated: Jan. 2022, pp. 1-16.

Jonathan Prados-Garzon et al., "Performance Modeling of Softwarized Network Services Based on Queuing Theory with Experimental Validation," IEEE Transactions on Mobile Computing, Dated: Feb. 14, 2020, pp. 1-16.

(Continued)

*Primary Examiner* — Schquita D Goodwin
*Assistant Examiner* — Mehulkumar J Shah
(74) *Attorney, Agent, or Firm* — Patterson + Sheridan, LLP (57) ABSTRACT

Techniques for simulation of orchestration and automation are disclosed. These techniques include simulating a distributed orchestration system using a simulation topology including a plurality of queues used in place of processing elements in the distributed orchestration system. The techniques further include identifying a plurality of characteristics of the simulation topology, after the simulation, and modifying the distributed orchestration system based on the plurality of characteristics.

20 Claims, 7 Drawing Sheets

(56) References Cited

OTHER PUBLICATIONS

Bin Han et al., "Multiservice-based Network Slicing Orchestration with Impatient Tenants," arXiv.org, Dated: Apr. 16, 2020.
Jonathan Prados-Garzon et al., "A Queuing based Dynamic Auto Scaling Algorithm for the LTE EPC Control Plane," Mosaic Lab, Date Access: Jul. 20, 2023, pp. 1-7.
Stefan Schneider et al., "Specifying and Analyzing Virtual Network Services Using Queuing Petri Nets," arxiv.org, Dated: Aug. 14, 2018, pp. 1-9.

* cited by examiner

QUEUE-BASED ORCHESTRATION SIMULATION

TECHNICAL FIELD

Embodiments presented in this disclosure generally relate to distributed orchestration and automation. More specifically, embodiments disclosed herein relate to simulation of orchestration and automation.

BACKGROUND

There is a trend towards more distributed orchestration systems where some parts of the functionality are centralized, while other parts are distributed to regional centers, and some functionality is integrated into the devices themselves. Distributed orchestration can be done for a wide variety of reasons, including solving problems in cross-domain orchestration, increasing reliability, and increasing performance. These are merely examples.

As the scope of automation increases and the complexity of the orchestration architecture increases, it becomes increasingly challenging to choose the design parameters that will give the appropriate performance. For example, with large and complex orchestration systems it is very hard to predict where bottlenecks will occur.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes simulating a distributed orchestration system using a simulation topology including a plurality of queues used in place of processing elements in the distributed orchestration system. The method further includes identifying a plurality of characteristics of the simulation topology, after the simulation. The method further includes modifying the distributed orchestration system based on the plurality of characteristics.

Embodiments further include a system, including a processor, and a memory having instructions stored thereon which, when executed on the processor, performs operations. The operations include simulating a distributed orchestration system using a simulation topology including a plurality of queues used in place of processing elements in the distributed orchestration system. The operations further include identifying a plurality of characteristics of the simulation topology, after the simulation. The operations further include modifying the distributed orchestration system based on the plurality of characteristics.

Embodiments further include a non-transitory computer-readable medium having instructions stored thereon which, when executed by a processor, performs operations. The operations include simulating a distributed orchestration system using a simulation topology including a plurality of queues used in place of processing elements in the distributed orchestration system. The operations further include identifying a plurality of characteristics of the simulation topology, after the simulation. The operations further include modifying the distributed orchestration system based on the plurality of characteristics.

Example Embodiments

Orchestration systems are, generally, coordinating functions that orchestrate how computer resources function. This can include, for example, network orchestration, cloud orchestration and workload orchestration systems. These are merely examples, and orchestration systems can coordinate a wide variety of resources.

Important functions of orchestration systems typically include provisioning of new services onto an underlying system, modification and deletion of existing services, and administrative tasks such as upgrading or checking the health of services. For example, a network orchestration system could include a central system that provisions VPN services onto a service provider network. The tasks for the orchestration system can include deciding which routers to configure, configuring them, and checking that the service was activated correctly. As another example, a cloud orchestration system could be a central system that provisions an application workload onto a cloud system. The tasks could include placing the workload onto the appropriate compute resources, configuring the network access and starting the application containers with the correct parameters. As noted, however, these are merely examples.

Production orchestration systems are often extremely large in scale (e.g., for major service providers). Testing these orchestration systems can be done using existing techniques, at a smaller scale, but existing techniques are infeasible for anything approaching production scale. Thus, while the information gleaned from testing is helpful, it is typically limited, and it is often very computationally expensive to experiment with a large number of different architectures.

In an embodiment, this can be improved by using queue networks to represent orchestration architectures. This allows for simulation and testing of production-scale networks, with reasonable computational resources. For example, each processing part of the orchestration system can be modeled as a queue. A queue is a suitable model for a processing element, because it can take input, act on the input for a configured length of time (e.g., hold the element in the queue for the configured length of time), and then discard the element or forward it to a connected queue. In an embodiment, the queues can be assigned a distribution time function reflecting how long elements should be held in the queue (e.g., to mimic processing). As one example, this could be done using a combination of normal distribution and exponential distributions, but this is merely one example and any suitable technique can be used. Lab tests can be used to estimate probability distributions, and the results of relatively limited lab testing can be used as the input to the orchestration system simulation.

In an embodiment, a queue system is then simulated by feeding orchestrations into the input queue and letting the system run. This simulation can generate results, indicating the performance of various aspects of the orchestration system. The simulated results can be used to draw conclusions about the system's behavior. For example, simulation results can be used to find bottlenecks in the orchestration, by identifying the queues with the longest wait times.

Further, the queue-based simulation of the orchestration system can be used to optimize the orchestration system by identifying which type of queue is leading to bottlenecks, and using the rules of the architecture to add more queues of that kind to distribute the load across queues.

Figure 1:
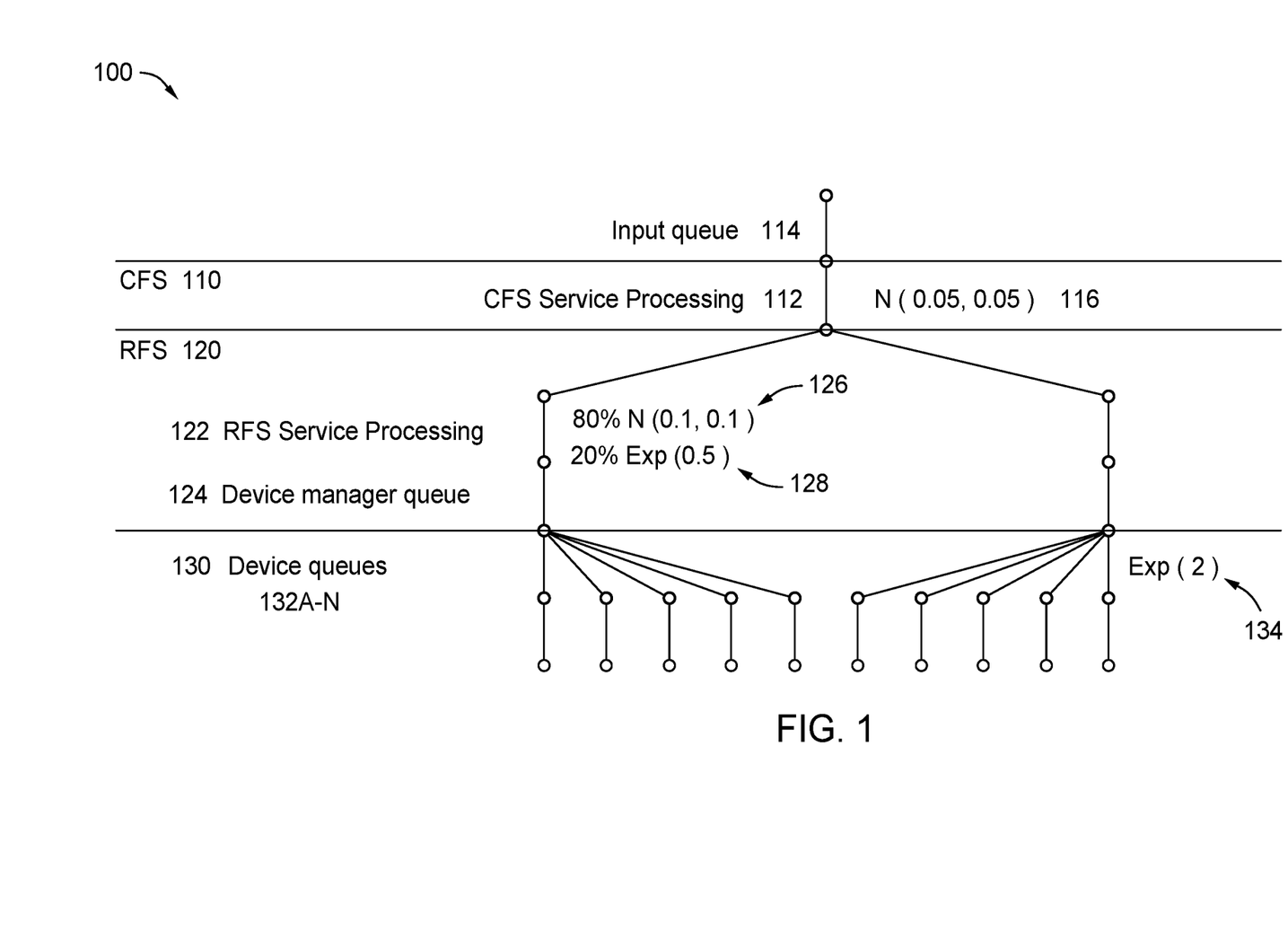
FIG. 1 illustrates an example services environment for queue based orchestration simulation, according to one embodiment.

FIG. 1 illustrates an example services environment 100 for queue based orchestration simulation, according to one embodiment. In an embodiment, the services environment relates to a distributed orchestration system and includes a three layer architecture: a customer facing service (CFS) 110, a resource facing service (RFS) 120, and a device layer 130. This is merely an example, and any suitable topology can be used. In one embodiment, a suitable topology includes elements that consume elements rather than just forward them to another element, so that orchestration is guaranteed to finish, but the topology does not need to be symmetric.

In an embodiment, service environment 100 includes multiple service processing elements (e.g., service processing elements operating in a computing environment to process input jobs), each of which is modeled using queues. For example, the CFS layer 110 includes CFS service processing 112. In an embodiment, the CFS service processing 112 is modeled as an input queue 114. The input queue 114 uses a distribution time function 116 to model how jobs are distributed in the queue (e.g., how the queue populates over time). In an embodiment, the distribution time function 116 is a normal distribution (e.g., N(0.05, 0.05)). This is merely an example, and any suitable distribution can be used.

The RFS layer 120 includes RFS service processing 122. In an embodiment, the RFS service processing 122 is modeled as a device manager queue 124, using distribution time functions 126 and 128. For example, the device manager queue 124 can use an 80% normal distribution 126 and 20% exponential distribution 128. This is merely an example, and any suitable distribution time function can be used.

The device layer 130 includes device processing. In an embodiment, the device processing is modeled using device queues 132A-N. The device queues 132A-N can use any respective distribution time functions 134 (e.g., exponential distributions). As discussed further below with regard to FIGS. 3-5, the respective queues 114, 124, and 132A-N form a simulation topology and can be used to model and simulate the orchestration services environment 100. For example, in an orchestration system jobs are consumed by the various service processing elements in the CFS layer 110, the RFS layer 120, and device layer 130. This orchestration system is modeled by replacing service processing elements with queues, and using the resulting topology to simulate (and improve) operation of the orchestration system.

Figure 2:
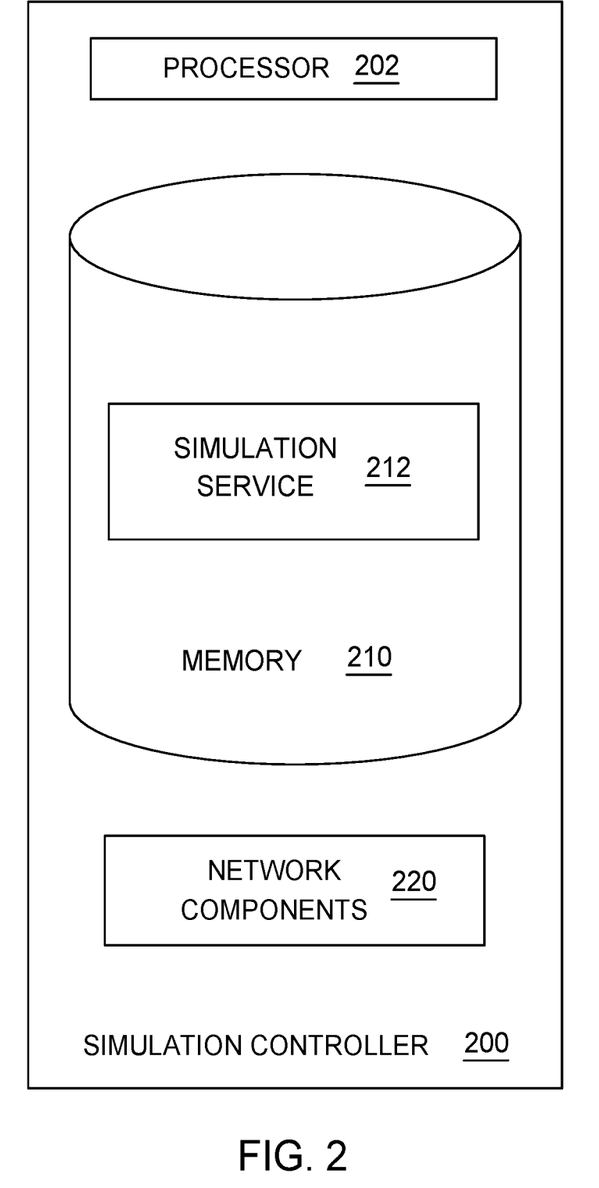
FIG. 2 illustrates a simulation controller for queue based orchestration simulation, according to one embodiment.

FIG. 2 illustrates a simulation controller 200 for queue based orchestration simulation, according to one embodiment. The simulation controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the simulation controller to interface with a communication network, (e.g., as part of the services environment 100 illustrated in FIG. 1). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the simulation controller 200. The program code is generally described as various functional "applications" or "modules" within the memory 210, although alternate implementations may have different functions and/or combinations of functions. Within the memory 210, the simulation service 212 facilitates queue based orchestration simulation. This is discussed further, below, with regard to FIGS. 3-5. For example, the simulation service 212 can be used to generate a simulation topology for an orchestration system by replacing service processing elements with queues. The simulation service 212 can then run simulations, using the simulation topology, and can be used to optimize the orchestration system (e.g., using a production-scale simulation).

Figure 3A:
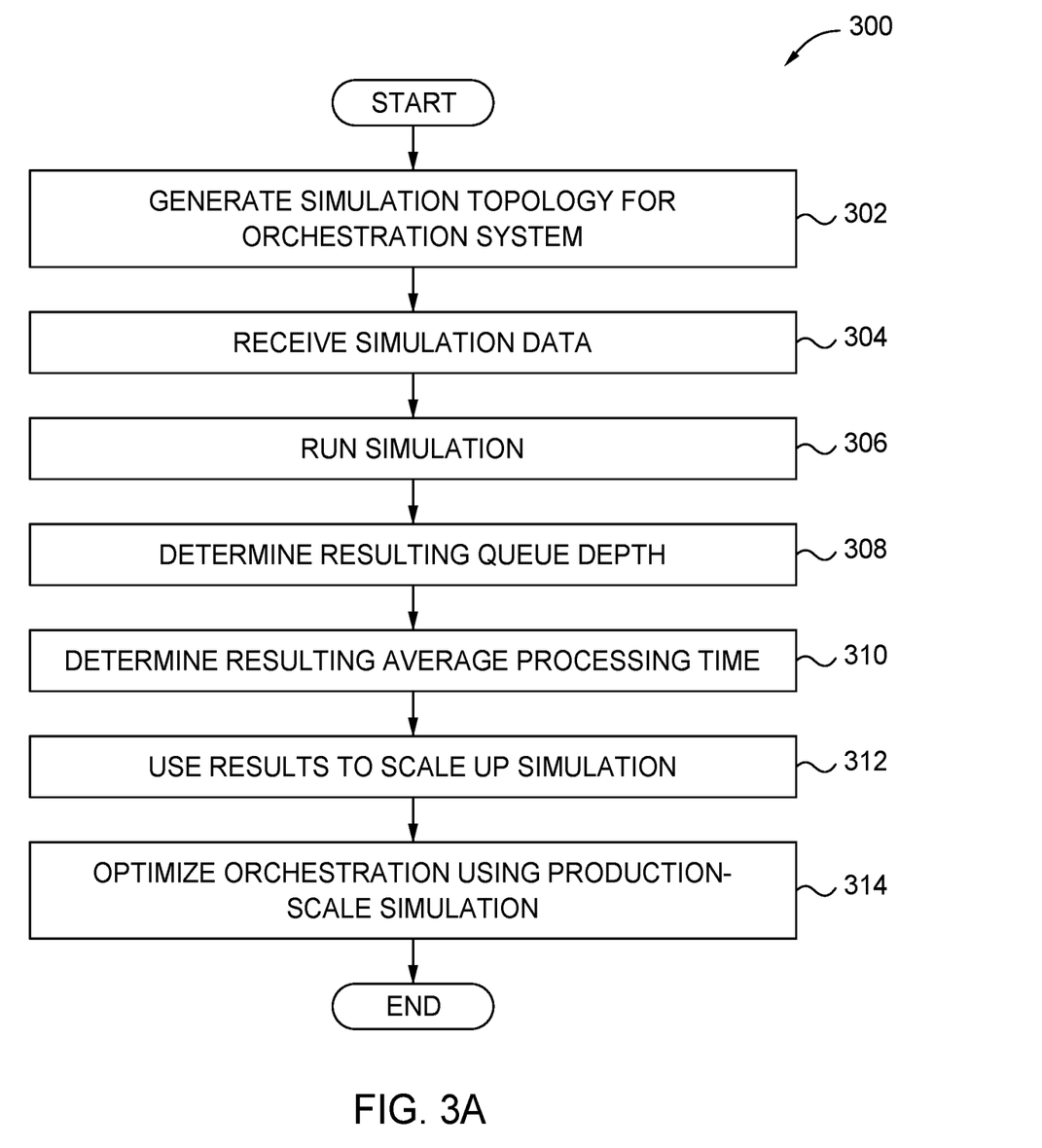
FIG. 3A illustrates a flowchart for queue based orchestration simulation, according to one embodiment.

FIG. 3A illustrates a flowchart 300 for queue based orchestration simulation, according to one embodiment. At block 302, a system administrator (e.g., a human administrator or an automated process) generates a simulation topology for an orchestration system. For example, as discussed above in relation to FIG. 1, an orchestration services architecture can be simulated by replacing service processing elements with queues. In an embodiment, the initial simulation parameters (e.g., distribution time functions) are generated based on lab test results (e.g., based on a limited scale test of the orchestration system). The distribution time functions can, for example, be used to configure a duration taken by orchestration service processing elements to allow for accurate simulation using a queue. Alternatively, or in addition, the simulation parameters are updated during simulation (e.g., based on sample test results during the simulation). This is discussed further, below, with regard to FIG. 3B.

At block 304, a simulation service (e.g., the simulation service 212 illustrated in FIG. 2) receives simulation data. For example, during testing the average processing times for each orchestration step can be measured and stored, the simulation service can receive this test data and use it to drive the orchestration simulation.

At block 306, the simulation service runs the simulation. For example, the simulation service can run the simulation for a designated period of simulated time (e.g., a number of seconds or minutes). This simulation period can be set by default, configured by a user (e.g., a human administrator), or set using any other suitable technique.

At block 308, the simulation service determines the resulting queue depth. In an embodiment, the queue depth in the simulation results reflects the number of orchestration events built up at each queue during simulation (e.g., built up at each processing element in the orchestration system). A larger queue depth indicates that the corresponding queue may be a bottleneck, or may be in a path with a bottleneck. As discussed further, below, with regard to block 312 and FIGS. 4A-5, the simulation service can use the results to scale up the simulation At block 310, the simulation service determines the resulting average processing time. In an embodiment, the average processing time can also indicate bottlenecks in the orchestration system. For example, a higher average processing time can indicate that additional paths are needed to parallelize and speed up orchestration.

At block 312, the simulation service uses the results to scale up the simulation. In an embodiment, the simulation service can use the results to generate a suitable distribution for the queues (e.g., a time distribution). This distribution can then be used in a production scale simulation. Further, the simulation service can draw samples from the simulation (e.g., in addition to, or in place of, generating a distribution), and can use the samples for production scale simulation.

At block 314, the simulation service optimizes orchestration using production-scale simulation. In an embodiment, the scaled up simulation parameters generated at block 312 can be used for a production scale simulation. As discussed further below with regard to FIGS. 4A-5, the production scale simulation results can then be used to optimize, or improve, the orchestration system.

In an embodiment, an iterative process is used to optimize orchestration. For example, an orchestration system can be simulated using queues. The results of the simulation can be used to modify the orchestration system (e.g., the orchestration system topology) to improve results. The modified orchestration system can then be simulated again, and results can be used to iteratively improve the orchestration system. In an embodiment, the simulation service ceases the iterative process when a desired benchmark is met (e.g., a maximum or average queue depth in the simulation, or a desired overall processing time). Alternatively, or in addition, the simulation service ceases the iterative process after a desired number of iterations (e.g., configured by a human administrator or automatically based on prior optimizations), when desired by a human administrator, or using any other suitable technique.

Figure 3B:
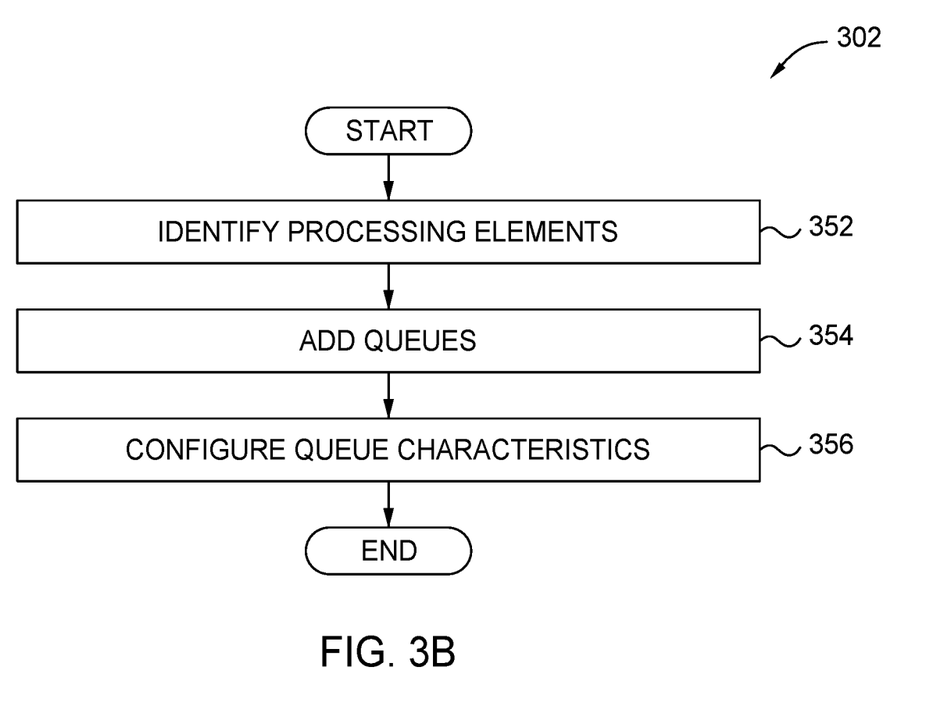
FIG. 3B illustrates a flowchart for generating a queue topology for queue based orchestration simulation, according to one embodiment.

FIG. 3B illustrates a flowchart for generating a queue topology for queue based orchestration simulation, according to one embodiment. In an embodiment, FIG. 3B corresponds with block 302 illustrated in FIG. 3A, above. At block 352 a simulation service (e.g., the simulation service 212 illustrated in FIG. 2) identifies processing elements. For example, as illustrated above in relation to FIG. 1, the simulation service can identify processing elements (e.g., service processing elements) in an orchestration system (e.g., CFS service processing, RFS service processing, and device processing, as illustrated above in relation to FIG. 1).

At block 354, the simulation service adds queues. For example, the simulation service can replace the identified processing elements with queues. As illustrated in FIG. 1, this includes the input queue 114, device manager queue 124, and device queues 132A-N. In one embodiment, each processing element in the orchestration system is replaced with a queue for simulation. Alternatively, a subset of processing elements in the orchestration system can be replaced with a queue. For example, an administrator (e.g., human administrator), a machine learning model (e.g., a trained ML model), or any other suitable source could be used to decide which processing elements are simulated using queues.

At block 356, the simulation service configures queue characteristics. For example, the initial queue parameters (e.g., distribution time functions) can be generated based on lab test results (e.g., based on a limited scale test of the orchestration system) or set by default (e.g., based on experience with prior orchestration systems). As one example, laboratory testing could suggest that a given operation (e.g., a processing element in the orchestration system) takes a given number of seconds, on average. Further, laboratory testing could suggest that an operation (e.g., the same operation or a different operation) follows a normal distribution in the duration of the operation. The simulation service can use the laboratory test results to configure initial queue parameters. Alternatively, or in addition, the simulation parameters can be updated during simulation (e.g., based on sample test results during the simulation). For example, results during testing can be used to set, or modify, queue parameters (e.g., a distribution of how long particular orchestration operations take for processing).

Figure 4A:
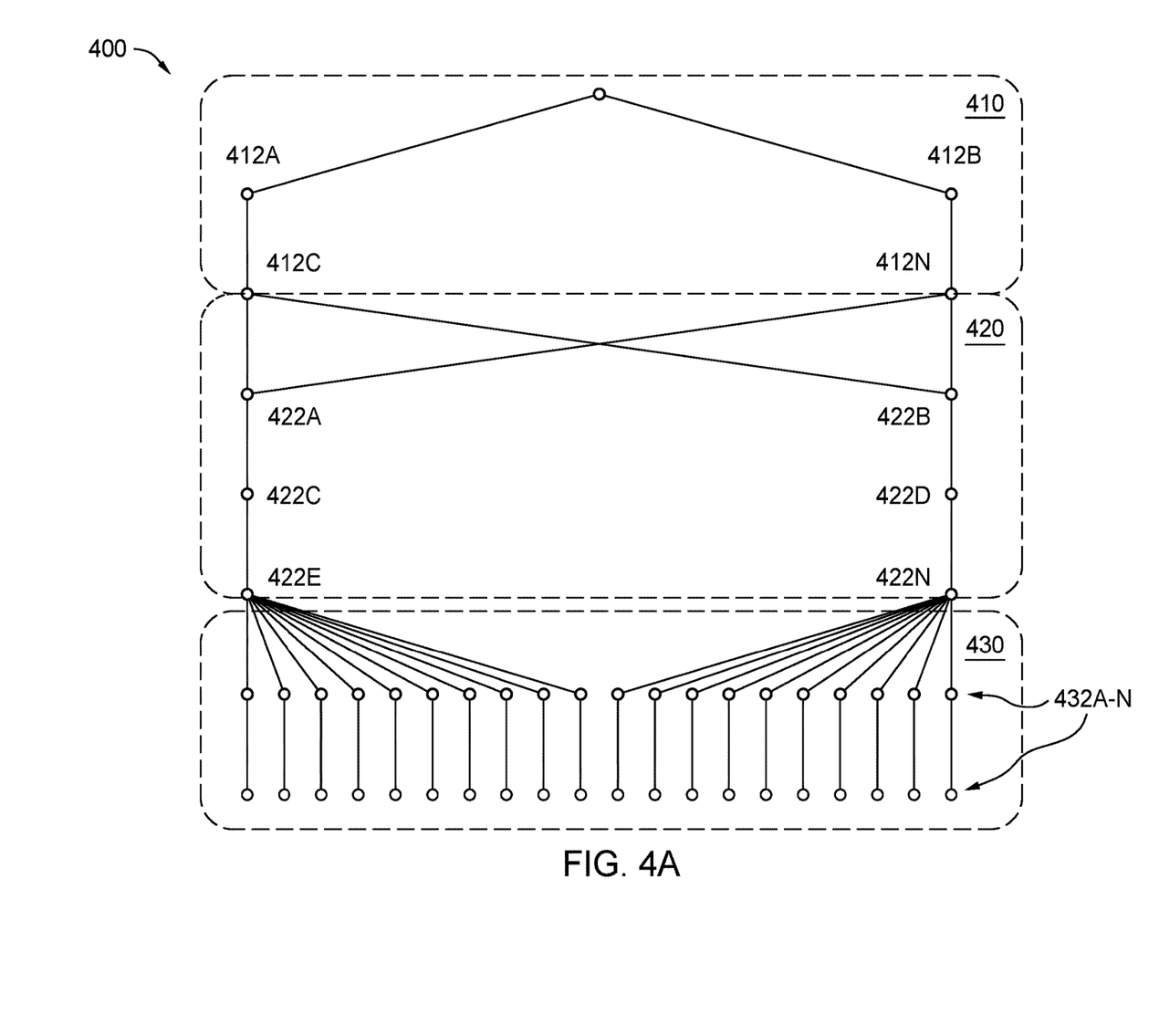
FIGS. 4A-B illustrate visualization of queue based orchestration simulation, according to one embodiment.

FIG. 4A illustrates a visualization 400 of queue based orchestration simulation, according to one embodiment. In an embodiment, the visualization 400 reflects queues used to model processing elements (e.g., elements in a computing environment that process input jobs). For example, a first layer 410 (e.g., a CFS layer) includes queues 412A-N. A second layer 420 (e.g., an RFS layer) includes queues 422A-N. A third layer 430 (e.g., a device layer) includes queues 432A-N. This is merely an example.

Figure 4B:
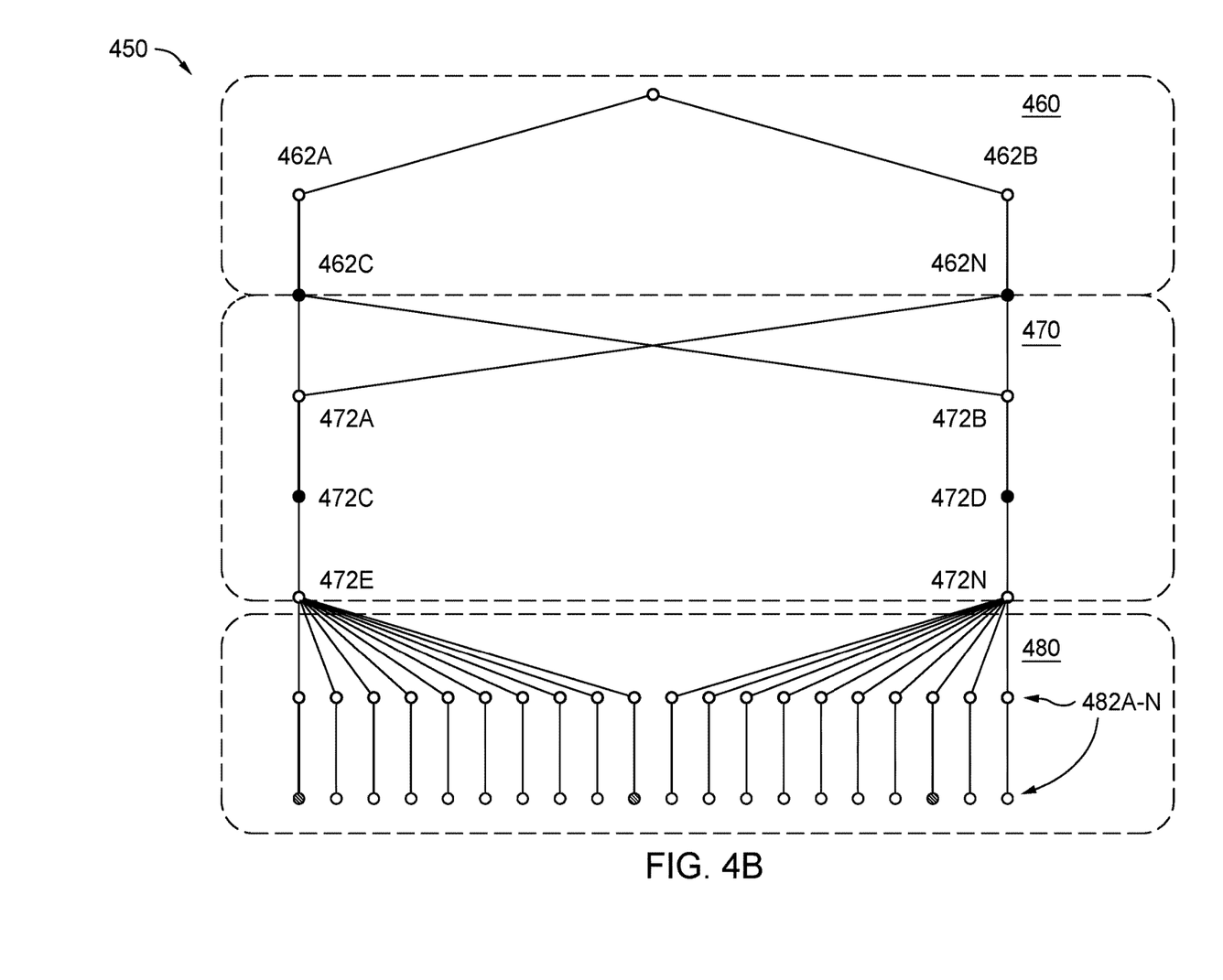

FIG. 4B illustrates a further visualization 450 of queue based orchestration simulation, according to one embodiment. In an embodiment, the visualization 450 corresponds to the visualization 400, illustrated in FIG. 4A, after running a simulation. A first layer 460 (e.g., a CFS layer) includes queues 462A-N, which correspond to the results for the first layer 410 after running the simulation. A second layer 470 (e.g., an RFS layer) includes queues 472A-N, which correspond to the results for the second layer 420 after running the simulation. A third layer 480 (e.g., a device layer) includes queues 482A-N, which correspond to the results for the third layer 430 after running the simulation. This is merely an example.

In an embodiment, the darker nodes indicate queues with a relatively large resulting queue depth, after simulation. For example, the queues 462C and 462N, and 472C and 472N, have a higher queue depth after simulation than other queues. In an embodiment, this indicates that these queues (or the paths leading to or from these queues) are bottlenecks in the orchestration system being simulated.

Figure 5:
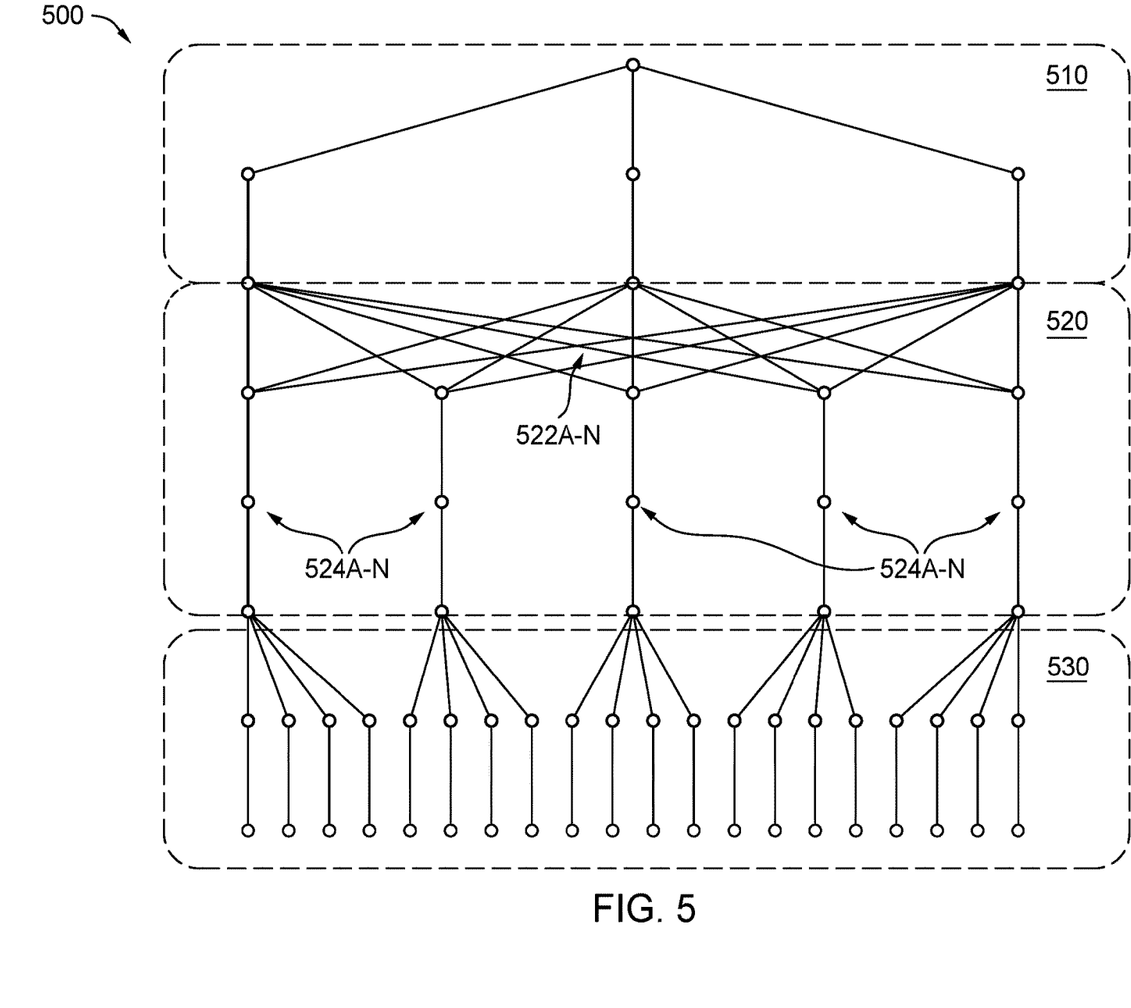
FIG. 5 illustrates visualization of an improved orchestration system using queue based orchestration simulation, according to one embodiment.

FIG. 5 illustrates a visualization 500 of an improved orchestration system using queue based orchestration simulation, according to one embodiment. In an embodiment, FIG. 5 reflects changes to an orchestration system after simulation. For example, the visualization 500 can reflect an optimized version of the orchestration system depicted in the visualizations 400 and 450, discussed above in relation to FIGS. 4A-B, after simulation.

For example, as discussed above, the queues 462C and 462N, and 472C and 472N illustrated in FIG. 4B had relatively higher queue depths, and were potential bottlenecks in the orchestration system. The visualization 500 reflects an improved architecture for the orchestration system, with additional paths 522A-N and additional nodes 524A-N (among other changes) added to reduce the bottlenecks. In an embodiment, the simulation of the orchestration system using queues as simulated processing elements allows for identification of the bottlenecks, and improvement of the orchestration system architecture.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    simulating a distributed orchestration system using a simulation topology comprising a plurality of interconnected queues used to replace interconnected processing elements in the distributed orchestration system, wherein each of the interconnected queues mimic a processing time of the replaced interconnected processing elements;
    identifying a plurality of characteristics of the simulation topology, after the simulation; and modifying the distributed orchestration system based on the plurality of characteristics.

2. The method of claim 1, wherein the distributed orchestration system comprises a plurality of processing elements and wherein the simulation topology replaces each of the plurality of processing elements with a queue.

3. The method of claim 2, wherein each queue is assigned a distribution time function used to determine a duration of time spent in the queue.

4. The method of claim 3, wherein each queue is assigned one of: (i) a normal distribution or (ii) an exponential distribution as the respective distribution time function.

5. The method of claim 1, wherein modifying the distributed orchestration system based on the plurality of characteristics comprises:
scaling up a simulation of the distributed orchestration system based on results from an earlier simulation, wherein the plurality of characteristics relate to the scaled up simulation.

6. The method of claim 1,
wherein the plurality of characteristics comprises a queue depth relating to at least one of the plurality of interconnected queues, and
wherein modifying the distributed orchestration system based on the plurality of characteristics comprises modifying the distributed orchestration system to reduce the queue depth.

7. The method of claim 6, wherein modifying the distributed orchestration system to reduce the queue depth comprises:
iteratively repeating simulation of the distributed orchestration system at least twice and modifying the distributed orchestration system to reduce the queue depth after each simulation.

8. The method of claim 1,
wherein the plurality of characteristics comprises an average processing time, and
wherein modifying the distributed orchestration system based on the plurality of characteristics comprises modifying the distributed orchestration system to reduce the average processing time.

9. The method of claim 1, wherein modifying the distributed orchestration system based on the plurality of characteristics comprises adding one or more processing elements to the distributed orchestration system.

10. A system, comprising:
a processor; and
a memory having instructions stored thereon which, when executed on the processor, performs operations comprising:
simulating a distributed orchestration system using a simulation topology comprising a plurality of interconnected queues used to replace interconnected processing elements in the distributed orchestration system, wherein each of the interconnected queues mimic a processing time of the replaced interconnected processing elements;
identifying a plurality of characteristics of the simulation topology, after the simulation; and
modifying the distributed orchestration system based on the plurality of characteristics.

11. The system of claim 10, wherein the distributed orchestration system comprises a plurality of processing elements and wherein the simulation topology replaces each of the plurality of processing elements with a queue.

12. The system of claim 11, wherein each queue is assigned a distribution time function used to determine a duration of time spent in the queue.

13. The system of claim 12, wherein each queue is assigned one of: (i) a normal distribution or (ii) an exponential distribution as the respective distribution time function.

14. The system of claim 10, wherein modifying the distributed orchestration system based on the plurality of characteristics comprises:
scaling up a simulation of the distributed orchestration system based on results from an earlier simulation, wherein the plurality of characteristics relate to the scaled up simulation.

15. The system of claim 10,
wherein the plurality of characteristics comprises a queue depth relating to at least one of the plurality of interconnected queues, and
wherein modifying the distributed orchestration system based on the plurality of characteristics comprises modifying the distributed orchestration system to reduce the queue depth.

16. A non-transitory computer-readable medium having instructions stored thereon which, when executed by a processor, performs operations comprising:
simulating a distributed orchestration system using a simulation topology comprising a plurality of interconnected queues used to replace interconnected processing elements in the distributed orchestration system, wherein each of the interconnected queues mimic a processing time of the replaced interconnected processing elements;
identifying a plurality of characteristics of the simulation topology, after the simulation; and
modifying the distributed orchestration system based on the plurality of characteristics.

17. The non-transitory computer-readable medium of claim 16, wherein the distributed orchestration system comprises a plurality of processing elements and wherein the simulation topology replaces each of the plurality of processing elements with a queue.

18. The non-transitory computer-readable medium of claim 17, wherein each queue is assigned a distribution time function used to determine a duration of time spent in the queue.

19. The non-transitory computer-readable medium of claim 16, wherein modifying the distributed orchestration system based on the plurality of characteristics comprises:
scaling up a simulation of the distributed orchestration system based on results from an earlier simulation, wherein the plurality of characteristics relate to the scaled up simulation.

20. The non-transitory computer-readable medium of claim 16,
wherein the plurality of characteristics comprises an average processing time, and
wherein modifying the distributed orchestration system based on the plurality of characteristics comprises modifying the distributed orchestration system to reduce the average processing time.

* * * * *